Nov. 27, 1923

V. ANDRIOLI

EXPANDING CROSSHEAD SHOE

Filed July 20, 1921    4 Sheets-Sheet 1

1,475,337

Inventor
Vittorio Andrioli
By
William C. Linton
Attorney

Nov. 27, 1923. 1,475,337
V. ANDRIOLI
EXPANDING CROSSHEAD SHOE
Filed July 20, 1921 4 Sheets-Sheet 2
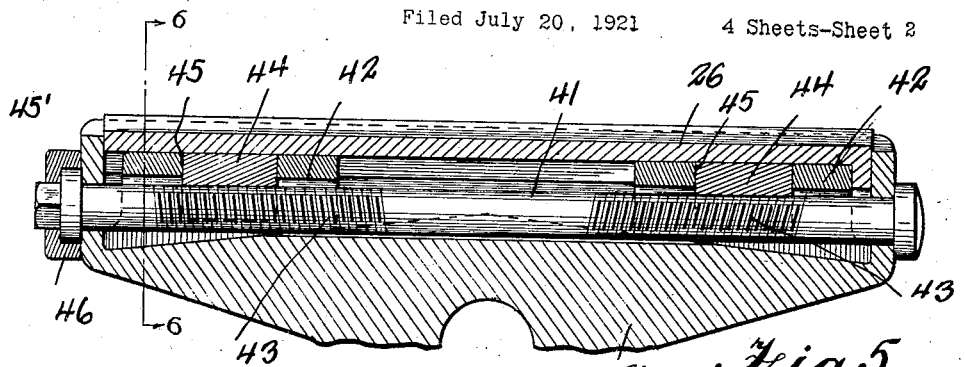
Fig. 5.
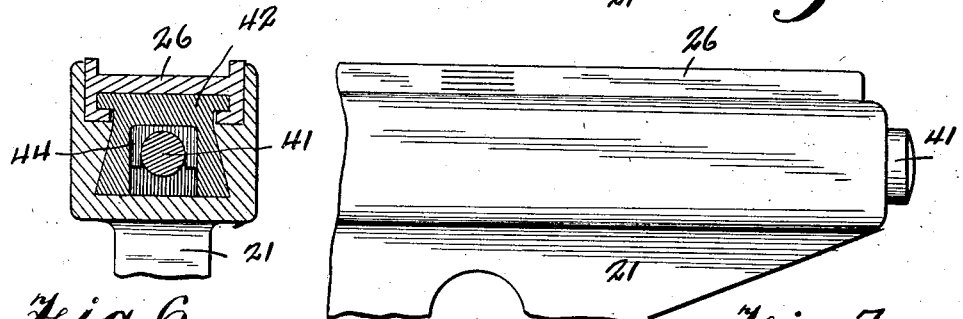
Fig. 6.
Fig. 7.
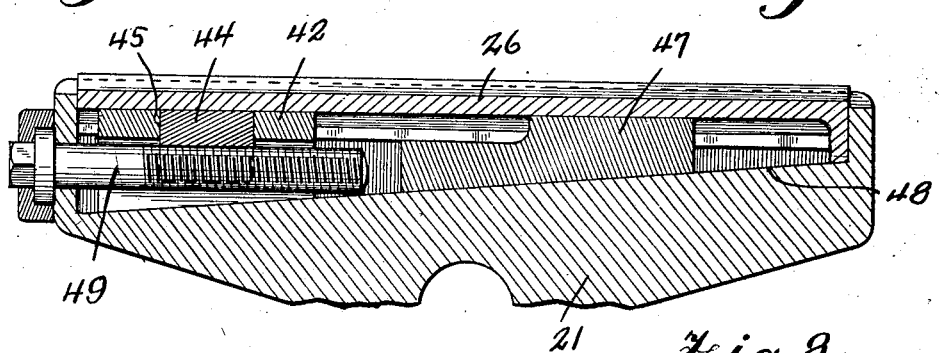
Fig. 8.
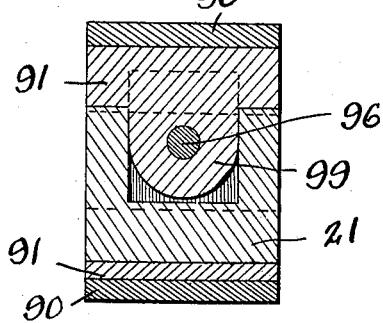
Fig. 19.
Inventor
Vittorio Andrioli
By
William C. Sinton
Attorney Nov. 27, 1923.

V. ANDRIOLI 1,475,337

EXPANDING CROSSHEAD SHOE

Filed July 20, 1921     4 Sheets-Sheet 3

Inventor
Vittorio Andrioli
By William Clinton
Attorney

Nov. 27, 1923.  
V. ANDRIOLI  
1,475,337  
EXPANDING CROSSHEAD SHOE  
Filed July 20, 1921  4 Sheets-Sheet 4

Inventor  
Vittorio Andrioli  
By William C. Linton  
Attorney

Patented Nov. 27, 1923.

1,475,337

UNITED STATES PATENT OFFICE.

VITTORIO ANDRIOLI, OF SCHENECTADY, NEW YORK.

EXPANDING CROSSHEAD SHOE.

Application filed July 20, 1921. Serial No. 486,192.

*To all whom it may concern:*

Be it known that I, VITTORIO ANDRIOLI, a subject of the King of Italy, residing in Schenectady, in the State of New York, United States of America, have invented certain new and useful Improvements in Expanding Crosshead Shoes; and I do hereby declare that the following is a full, clear, and exact description of the invention, such as will enable others skilled in the art to which it appertains to make and use the same.

The present invention relates to new and useful improvements in crosshead shoes for use in steam engines and particularly in locomotives.

The primary object of the invention is the provision of means for adjusting the crosshead shoes so that they will always properly engage their guides preventing any loose connections which would serve to have a detrimental effect on the locomotive or engine to which the invention is applied.

In the present crossheads in use with steam engines and especially in locomotives for the connection of the connecting rods with the piston rods and the crossheads travelling on the parellel guide bars, the continuous operation of these crossheads effects considerable wearing of the crosshead shoes, causing a material loosening which cannot be repaired unless they are replaced. This said loosening forces the piston rods out of centre which are connected both with the piston and with the crosshead, giving an unequal movement of the piston rod and causing an alternative movement internally of the piston. This causes the interior wearing of the cylinder surfaces with the result that it is necessary to remove the cylinders for internal refitting or to apply a new ferrule so as to obtain the original diameter of the cylinder. By the application of the present invention, however, this loosening of the crosshead can be taken up by the adjustment of the shoes maintaining the crossheads in the exact centre and eliminating crosshead trouble and the consequent deformation of the interior surface of the cylinder with great economical advantages and both the saving of material and labour, as well as increasing the durability and service of the engine.

Besides maintaining the crosshead in exact contact with the parallel guide bars, it will also prevent the vibration to the various parts, which is a great advantage in the maintenance of the whole mechanism, and also give considerably more power to the engine.

A further object of the invention is the provision of an expanding crosshead shoe which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawings, forming a part of the present application, and in which:

Figure 5 is a longitudinal sectional view taken through a modified form of the invention;

Figure 6 is a transverse sectional view taken on the line 6—6 of Figure 5;

Figure 7 is a side elevation of one end of the crosshead showing the shoe with the indication marks thereon;

Figure 8 is a modified form of the invention similar to Figure 5 but showing a single operating screw;

Figure 19 is a transverse sectional view taken on the line 19—19 of Figure 17; and, Figure 20 is a similar view taken on the line 20—20 of Figure 18.

Figure 1:
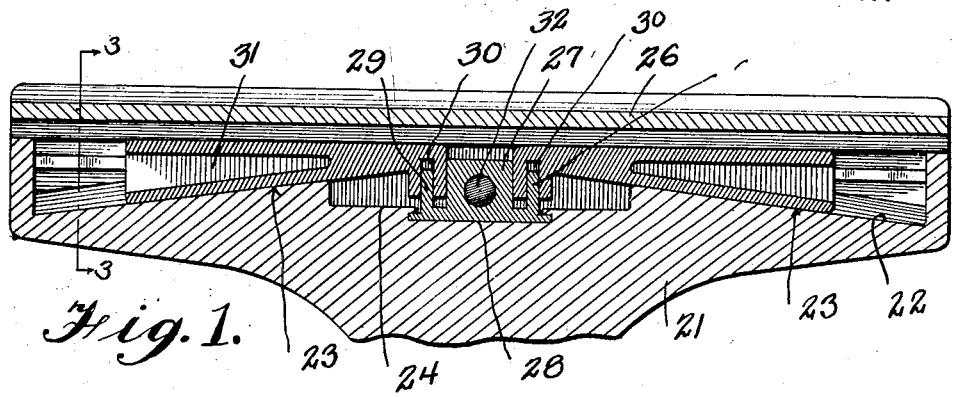
Figure 1 is a longitudinal sectional view taken through one form of the invention.
Figure 2:
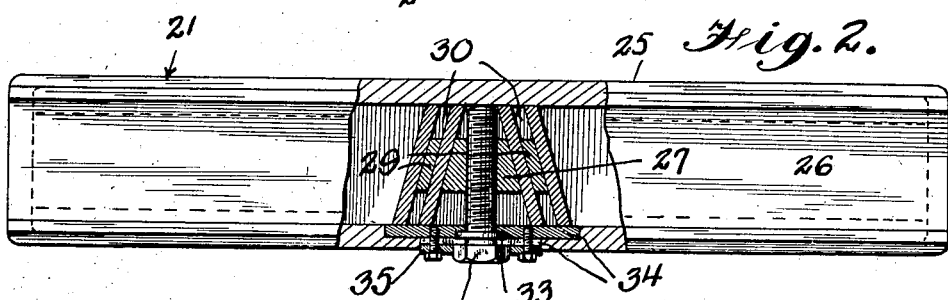
Figure 2 is a plan view of the central portion thereof broken away, showing the adjusting means in section.

Referring now to the accompanying drawings by corresponding characters of reference throughout the several views, and particularly to Figures from 1 to 4 inclusive, the numeral 21 designates a portion of a crosshead which is provided with a recess 22 opening through the upper side thereof, and which is provided at its opposite ends with bevelled surfaces 23 and with a horizontal cavity 24 interposed between the bevelled portions 23 for receiving the operating mechanism.

Flanges shown at 25 are formed upon the opposite edges of the crosshead 21 and seated between these flanges is the crosshead shoe shown at 26. A transversely movable operating block 27 is seated in the cavity 24, being slidably received within a groove 28. A pair of angular flanges shown at 29 are provided upon the opposite ends of the block 27 and engage the angular grooves 30 formed in the inner ends of the wedged lifting members 31. A screw 32 is threaded in the block 27 and obviously upon the rotation of this screw in opposite directions the block will be moved transversely of the crosshead 21, moving the wedged lifting members 31 in opposite directions upon the bevelled surfaces 23 and raising and lowering the shoe 26, the underside of which these said members 31 engage.

Figure 3:
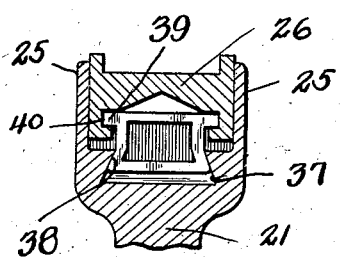
Figure 3 is a transverse sectional view taken on the line 3—3 of Figure 1.
Figure 4:
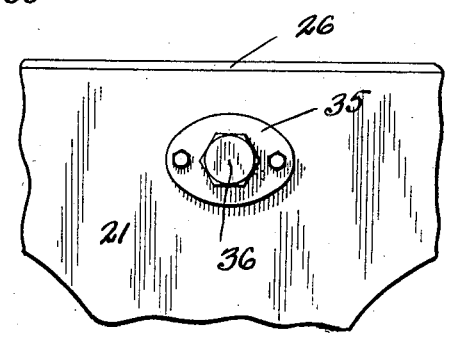
Figure 4 is a fragmentary front elevation showing the protruding end of the adjusting screw.
Figure 20:
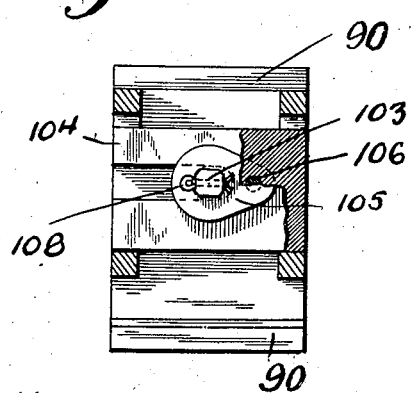

A flange 33 is formed on the screw element 32 and fits between the locking plates 34, while a plate 35 is bolted thereto, which has an opening therein corresponding to the shape of the head 36 of the screw element 32 which prevents any undesired rotation of the screw element and locks it in its desired position against displacement. The opposite sides of the recess 22 are preferably dovetailed as at 37, as shown in Figure 3, which prevents the displacement or undesired movement of the members 31, the sides of which are likewise dovetailed, as at 38 to engage therewith, while the upper sides of the members are provided with projecting flanges 39 which fit within the interlocking grooves 40 of the shoe 26.

A modified form of the invention is shown in Figures from 5 to 7 inculsive, in which a longitudinally extending screw 41 is journaled in the ends of the crosshead shoe 26 and also in the wedged lifting members shown at 42. The ends of this screw element 41 are oppositely threaded as shown at 43 and engage the nuts 44 which fit within grooves 45 formed in the wedged lifting members 42, and obviously upon the rotation of the screw element 41 in opposite directions, the said wedged lifting members 42 will be moved in a manner similar to that previously described, raising and lowering the crosshead shoe 26 in the usual manner.

One end of the screw element 41 is formed angular, as at 45′ for receiving a suitable tool by means of which the said screw element can be rotated, while a locking device 46 is designed to engage the same to prevent any unnecessary and undesired rotation. The device disclosed in Figure 8 is similar to that shown in Figures from 5 to 7 inclusive with the exception that in Figures from 5 to 7 the screw element is formed double to engage two wedged lifting blocks 42 which, in Figure 8, are dispensed with and a single wedged lifting block 47 is employed to engage the bevelled surface 48 of the crosshead shoe, while a single screw element is employed and shown at 49.

Figure 9:
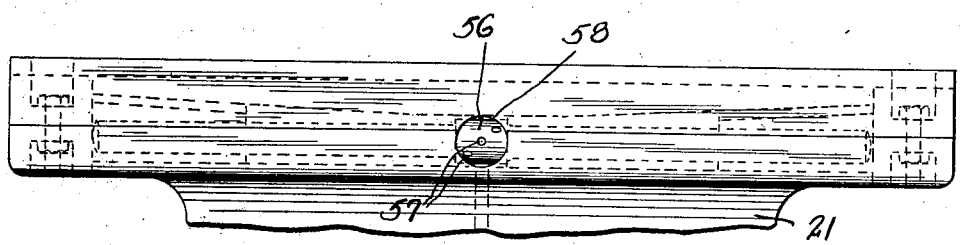
Figure 9 is a side elevation of the upper portion of a crosshead showing a still further modification of the invention.
Figure 10:
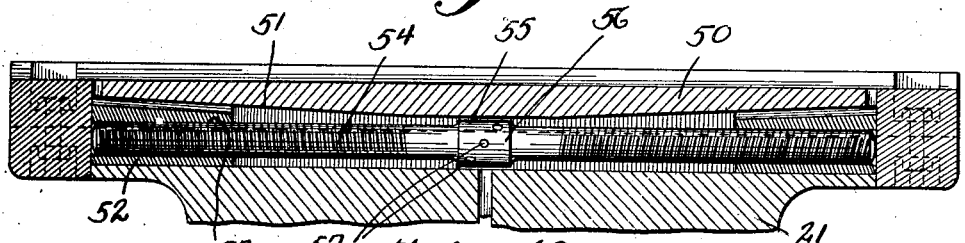
Figure 10 is a longitudinal sectional view thereof.

The device shown in Figures 9 and 10 is of still further modification, and in this instance the crosshead shoe 50 is bevelled as at 51 rather than the crosshead as shown in the previous disclosures. In this case the upper sides of the wedged lifting blocks 52 are bevelled to engage the bevelled surfaces of the shoe, while they are interiorly threaded as shown at 53 to engage the oppositely threaded ends 54 of an operating screw 55 which is provided with a central head 56 formed with openings 57 for the reception of a tool which may be inserted through the opening 58 formed in the crosshead for the rotation of the screw in opposite directions to raise and lower the said crosshead shoe 50.

Figure 11:
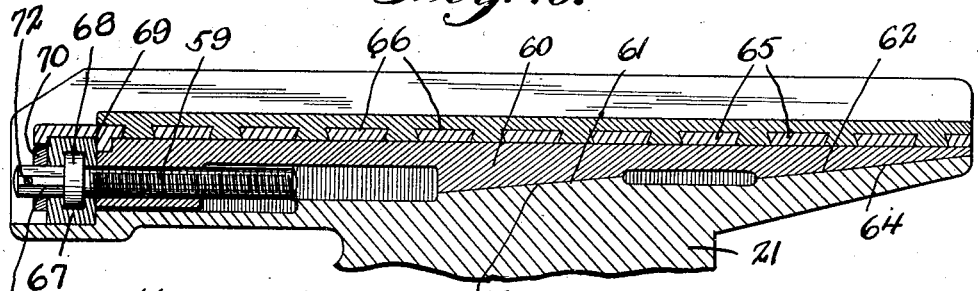
Figure 11 is a longitudinal sectional view showing an additionally modified form of the invention.
Figures 12, 13:
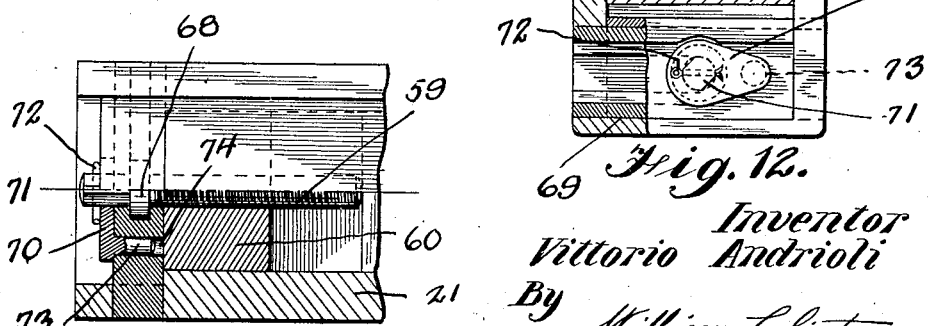
Figure 12 is an end view thereof partly in section.
Figure 13 is a detail view illustrating the locking mechanism for the screw.

The device disclosed in Figure 11 is of similar nature to that shown in Figure 10 with the exception that a single screw element 59 and a single wedged lifting block 60 is employed in substitution for the double arrangement shown in Figures 9 and 10. The underside of the wedged lifting block in this case is bevelled at two points 61 and 62 to engage respectively the bevelled surfaces 63 and 64 of the crosshead, while wear plates 65 are inserted in grooves 66 formed in the underside of the crosshead shoe for preventing any unnecessary wearing thereof. In order to lock the screw 59 against movement, a U-shaped member 67 is inserted over the collar 68 through one end of the transfer slot 69, while a latch member 70 slips over the head 71 of the screw element in which position it is held by a cotter pin 72. A pin 73 projects from one side of the latch plate 70 and engages an opening 74 formed in the U-shaped member 67 which locks the several parts against any undesired movement.

Figure 14:
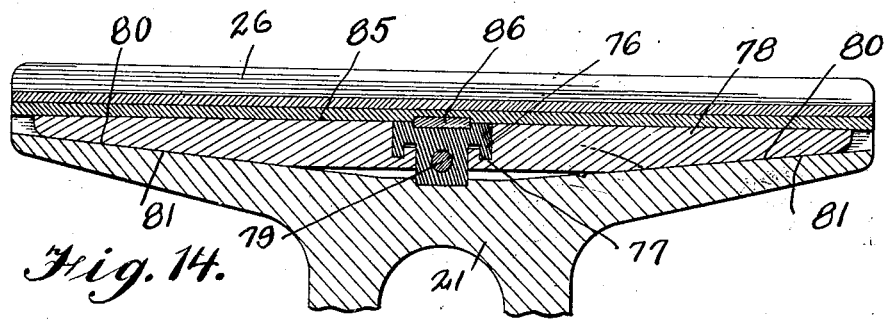
Figure 14 is a longitudinal sectional view showing an additional modification of the invention.
Figure 15:
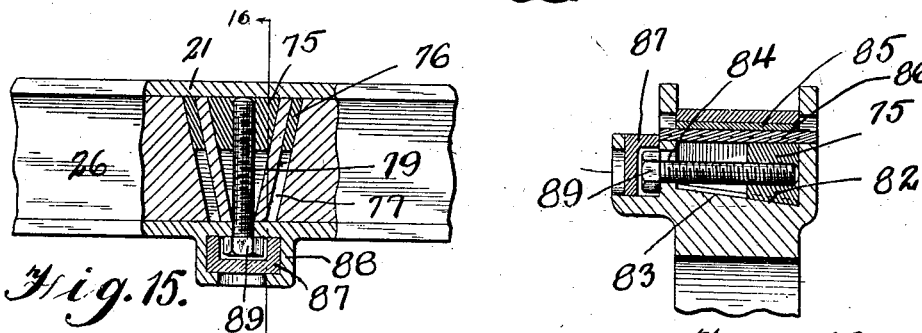
Figure 15 is a plan view showing the central portion thereof in section and the ends broken away.
Figure 16:
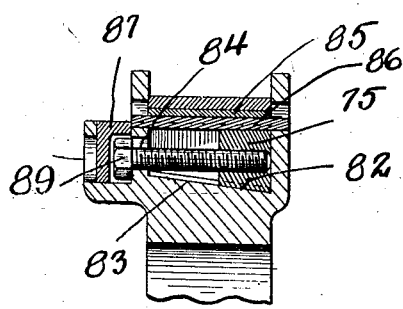
Figure 16 is a transverse sectional view taken on the line 16—16 of Figure 14.
Figure 17:
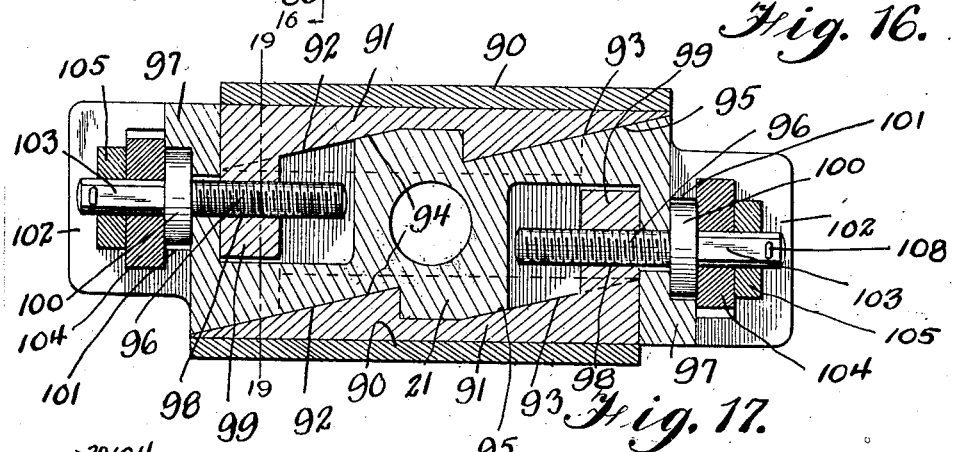
Figure 17 is a longitudinal sectional view taken through a similar type of crosshead.
Figure 18:
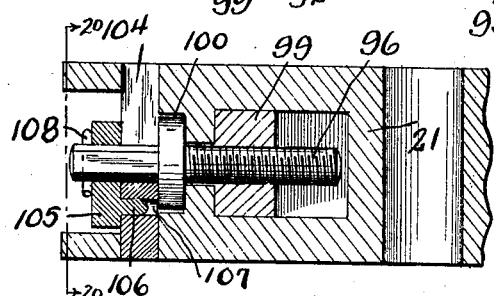
Figure 18 is a horizontal sectional view taken through one end thereof.

Figures 14, 15 and 16 illustrate a modification which is somewhat similar to Figures from 1 to 4 inclusive, having a transversely slidable operating block 75 provided with flanges 76 which extend at an angle and engage the angular grooves 77 formed upon the inner ends of the wedged lifting blocks 78. The operating screw is shown at 79, and upon the rotation thereof, the said blocks will be raised and lowered by virtue of the bevelled faces 80 and 81 formed upon the blocks 78 and crosshead respectively. In this instance, the lower side of the block 75 is bevelled as at 82 to engage the transversely bevelled surface 83 of the crosshead, so that the central portion of the wedged lifting blocks will be raised a corresponding degree in comparison to the outer sides thereof, and to permit this, slots are provided and shown at 84 to permit the raising of the shoe as the block 75 is raised. The underside of the shoe is provided with a reinforcing plate 85 which is held in position by a central key 86, while a suitable locking clip, shown at 87 may be inserted in the channel extension 88 of the crosshead for engagement with the head 89 of the operating screw 79 for preventing its undesired rotation.

Referring now to Figures 17, 18, 19 and 20, a last modification is shown in which the opposite shoes are adjusted equally with respect to each other. These shoes are shown at 90, and rest upon the outer sides of the wedged blocks 91 which are provided with bevelled surfaces 92 and 93 for engaging the corresponding bevelled surfaces 94 and 95 formed in the opposite sides of the crosshead. Adjusting screws 96 are loosely mounted for rotation in the ends 97 of the crosshead and have threaded engagement, as shown at 98 with the lugs 99 of the respective wedged lifting blocks 91 so that upon the rotation of the screws, the said blocks will be moved in opposite directions and by the cooperation of the said bevelled faces, the shoes 90 will be forced to and from each other in the proper and desired manner. In order to lock these screw elements 96 against displacement, collars 100 are provided thereon, which fit within grooves 101 of the extensions 102. The heads of the screw elements are formed angular as at 103 and are adapted to receive the U-shaped members 104 corresponding to the U-shaped members 67 previously described.

Locking plates 105 have openings therein corresponding to the openings of the heads 103, over which the said plates 105 pass. These plates 105 have pins 106 projecting therefrom for insertion into openings 107 formed in the U-shaped members 104 in which position they are held by cotter pins 108, which prevents any undesired movement of the screw elements 96.

From the foregoing description, taken in connection with the accompanying drawings, it will be manifest that an expansible shoe for crossheads is provided, which will fulfil all of the necessary requirements of such a device.

Having thus fully described the invention, what I claim as new and desire to secure by Letters Patent is:

1. The herein described apparatus comprising a crosshead having a longitudinal groove formed therein, said groove having oppositely bevelled surfaces, lifting blocks movable on said bevelled surfaces, a shoe resting upon the lifting blocks, and means for actuating said blocks.

2. The herein described apparatus comprising a crosshead having a longitudinal groove formed therein, said groove having oppositely bevelled surfaces, lifting blocks movable on said bevelled surfaces, a shoe resting upon the lifting blocks, and means for simultaneously actuating said blocks.

3. The herein described apparatus comprising a crosshead, said crosshead having a longitudinal groove formed therein and provided with bevelled surfaces, a screw actuating element having oppositely threaded portions at the ends thereof mounted longitudinally of the grooves, lifting blocks movable on said bevelled surfaces, nuts carried by the lifting blocks, and engaging the threads at the opposite ends of the screw element, and a shoe resting upon the lifting blocks, substantially as and for the purposes set forth.

4. The herein described apparatus including a crosshead having a groove formed therein and provided with a bevelled surface at the bottom of the groove, a lifting block movable longitudinally of the groove upon said bevelled surface and bevelled to conform to the bevelled surface of the bottom of the groove, a crosshead shoe resting upon the lifting block, said lifting block having a groove formed therein, a threaded element mounted in said groove, a nut passing through a slot formed in the lifting block, and having threaded engagement with the threaded element, and means for engaging the head of the screw element for preventing undesired rotation.

5. The herein described apparatus comprising in combination, a crosshead having a longitudinal groove formed therein, wedge shaped lifting blocks slidable longitudinally of said groove, a screw element having threaded engagement with the wedge shaped lifting blocks for sliding the same longitudinally of the crosshead in opposite directions upon the rotation of the screw element, means for rotating the screw element, a crosshead shoe located in the groove and engaging the lifting blocks, substantially as and for the purposes set forth.

6. The herein described apparatus comprising a crosshead, said crosshead having a groove formed therein provided with bevelled surfaces, a wedge shaped lifting member having bevelled surfaces engaging the bevelled surfaces of the groove for longitudinal movement in the latter, a screw element having threaded engagement with the lifting block, whereby upon its rotation the block may be moved longitudinally of the groove, and a crosshead shoe resting upon the lifting block.

7. The herein described apparatus comprising a crosshead having opposite bevelled faces, wedge shaped lifting blocks having bevelled sides engaging the opposite faces of the crosshead, said wedge blocks having threaded lugs formed thereon, and a screw element passing through the ends of the crosshead and threaded in said lugs, whereby the lifting blocks will be moved in opposite directions upon the rotation of the screw element, and means for locking the screw element against displacement.

8. In a crosshead having opposed inclined surfaces at both top and bottom, slippers at both the top and the bottom of the crosshead, pairs of opposed wedge shaped members inserted between the slippers and inclined surfaces at the top and bottom and means for moving the opposed wedge shaped members up and down the opposed inclined surfaces for adjusting the slippers vertically.

9. In a crosshead having opposed inclined surfaces at both top and bottom, slippers at both the top and the bottom of the crosshead, pairs of opposed wedge shaped members inserted between the slippers and inclined surfaces at the top and bottom and means for moving the opposed wedge shaped members in unison up and down the opposed inclined surfaces for adjusting the slippers vertically.

In witness whereof I have hereunto set my hand.

VITTORIO ANDRIOLI.

Witness:
PIETRI GERA.